(12) United States Patent
Chang

(10) Patent No.: US 11,815,367 B2
(45) Date of Patent: Nov. 14, 2023

(54) BATTERY-FREE ROTATION DETECTING DEVICE

(71) Applicant: INDUSTRIAL TECHNOLOGY RESEARCH INSTITUTE, Hsinchu (TW)

(72) Inventor: Jui-Ping Chang, Kaohsiung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 17/553,881

(22) Filed: Dec. 17, 2021

(65) Prior Publication Data

US 2023/0103053 A1 Mar. 30, 2023

(30) Foreign Application Priority Data

Sep. 27, 2021 (TW) .................................. 110135865

(51) Int. Cl.
*G01D 5/20* (2006.01)

(52) U.S. Cl.
CPC ...................................... *G01D 5/20* (2013.01)

(58) Field of Classification Search
CPC .......... G01D 5/20; G01D 5/145; G01D 5/142; G01D 5/2013; G01D 5/14; G01D 5/12; G01P 3/4815; H02K 49/102

See application file for complete search history.

(56) References Cited

U.S. PATENT DOCUMENTS

| 5,747,797 A * | 5/1998 | Fujita ..................... H03M 1/308 250/231.14 |
| 6,737,861 B2 * | 5/2004 | Lantto ...................... G01D 5/20 324/207.16 |

(Continued)

FOREIGN PATENT DOCUMENTS

| CN | 101584116 A | 11/2009 |
| CN | 101645688 A | 2/2010 |

(Continued)

OTHER PUBLICATIONS

Chao Yang et al., Improvement of Pulse Voltage Generated by Wiegand Sensor Through Magnetic-Flux Guidance, Sensors, 2020, 20, 1408.

(Continued)

*Primary Examiner* — Akm Zakaria
(74) *Attorney, Agent, or Firm* — Locke Lord LLP; Tim Tingkang Xia, Esq.

(57) ABSTRACT

A battery-free rotation detecting device includes a rotating carrier, a first magnetic element, a second magnetic element and at least one detection coil set. The rotating carrier can be assembled with a rotating element. The first magnetic element is disposed to the rotating carrier, and the second magnetic element is also disposed to the rotating carrier but spaced from the first magnetic element. The at least one detection coil set is located between the first magnetic element and the second magnetic element. The rotating carrier can be driven by the rotating element so as further to rotate the first magnetic element and the second magnetic element synchronously. The at least one detection coil set generates an electrical signal upon when a change of the magnetic field between the first magnetic element and the second magnetic element is detected.

20 Claims, 14 Drawing Sheets

(56) References Cited

U.S. PATENT DOCUMENTS

| | | | |
|---|---|---|---|
| 7,061,231 B2* | 6/2006 | Momose | G01D 5/204 |
| | | | 324/228 |
| 7,598,733 B2 | 10/2009 | Mehnert et al. | |
| 10,444,036 B2* | 10/2019 | Mitsuhashi | G01D 5/34792 |
| 10,697,803 B2 | 6/2020 | Kasuga | |
| 10,778,050 B2 | 9/2020 | Chen et al. | |
| 2014/0062465 A1* | 3/2014 | Oyama | G01D 5/245 |
| | | | 324/207.17 |
| 2015/0015245 A1* | 1/2015 | Inoue | G01D 5/12 |
| | | | 324/207.13 |
| 2015/0253153 A1* | 9/2015 | Smithanik | G01D 5/2013 |
| | | | 324/207.25 |
| 2016/0216132 A1* | 7/2016 | Ausserlechner | G01D 5/14 |
| 2018/0351422 A1 | 12/2018 | Chen et al. | |
| 2019/0186891 A1* | 6/2019 | Utermoehlen | G01D 5/2053 |
| 2022/0099462 A1* | 3/2022 | Egawa | G01P 3/4815 |
| 2022/0252431 A1* | 8/2022 | Bühler | G01D 5/145 |

FOREIGN PATENT DOCUMENTS

| | | |
|---|---|---|
| CN | 204361870 U | 5/2015 |
| CN | 110823300 A | 2/2020 |
| TW | 201330455 A | 7/2013 |
| TW | 201344159 A | 11/2013 |
| TW | 201706573 A | 2/2017 |
| TW | 201917353 A | 5/2019 |
| TW | 202018258 A | 5/2020 |

OTHER PUBLICATIONS

Stefano Saggini et al., Low-power energy harvesting solutions for Wiegand transducers, IEEE Journal of Emerging and Selected Topics in Power Electronics, 2015, vol. 3, No. 3.

Xiaoya Sun et al., Output Characteristics and Circuit Modeling of Wiegand Sensor, Sensorsm, 2019, 19, 2991.

Taiwan Patent Office, "Office Action", dated Nov. 2, 2022.

* cited by examiner

BATTERY-FREE ROTATION DETECTING DEVICE

CROSS REFERENCE TO RELATED APPLICATION

This application claims the benefits of Taiwan application Serial No. 110135865, filed Sep. 27, 2021, the disclosures of which are incorporated by references herein in its entirety.

TECHNICAL FIELD

The present disclosure relates in general to a rotation detecting device, and more particularly to a battery-free rotation detecting device.

BACKGROUND

With the development of automated manufacturing technology, rotating devices can be seen in many industrial fields, in which these rotating devices include motors, machine tools, photoelectric process machinery, multi-axis robotic arms and son on. These rotating devices are usually equipped with rotation detectors for converting mechanical displacements into corresponding electrical signals according to photoelectric or electromagnetic principles, so as to detect and monitor whether or not the respective rotating devices are in operation, the number of rotations or the directions of rotations. In particular, since the rotation detector for monitoring, tracking and recording the number of rotations or the status of the corresponding rotating device is demanded to keep detecting and monitoring even when the external power supply is interrupted, thus it is usually equipped with a battery.

Therefore, the conventional rotating detector shall follow periodical inspection and battery replacement. While the rotating device meets a battery replacement, the related production line may have to be interrupted for a substantial duration of time. As a result, the production capacity would be affected, and the maintenance costs may be hiked. Moreover, with the miniaturization trend of devices, such as the machine tool, and the increasing demand for high-density installations of machines, thus a feasible solution for the volume and configuration of the rotation detector to meet the miniaturization requirements must be proposed.

Therefore, how to provide a "battery-free rotation detecting device", that can reduce maintenance cost and time, and can meet the miniaturization requirements, has become an important issue to be resolved in the art.

SUMMARY

In one embodiment of this disclosure, a battery-free rotation detecting device, applied to engage a rotating element, includes a rotating carrier, a first magnetic element, a second magnetic element and at least one detection coil set. The rotating carrier is configured to engage the rotating element. The first magnetic element is disposed to the rotating carrier. The second magnetic element is disposed to the rotating carrier by being spaced from the first magnetic element. The at least one detection coil set is disposed between the first magnetic element and the second magnetic element. As the rotating carrier is driven to rotate by the rotating element, the rotating carrier, the first magnetic element and the second magnetic element rotate with respect to the at least one detection coil set synchronously, and an electrical signal is induced in the at least one detection coil set by a change of a magnetic field around the at least one detection coil set.

In another embodiment of this disclosure, a battery-free rotation detecting device, applied to engage a rotating element, includes a rotating carrier, a first magnetic element, a second magnetic element, at least one detection coil set, a light source module, a grating code disc and an optical sensor. The rotating carrier is configured to engage the rotating element. The first magnetic element is disposed to the the rotating carrier. The second magnetic element is disposed to the rotating carrier by being spaced from the first magnetic element. The at least one detection coil set is disposed between the first magnetic element and the second magnetic element. As the rotating carrier is driven to rotate by the rotating element, the rotating carrier, the first magnetic element and the second magnetic element rotate with respect to the at least one detection coil set synchronously, and an electrical signal is induced in the at least one detection coil set by a change of a magnetic field around the at least one detection coil set. The light source module is disposed between the first magnetic element and the second magnetic element and configured to provide a light. The grating code disc is disposed to the rotating carrier. The optical sensor is configured to receive the light penetrating through the grating code disc and further output a rotation information.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

DETAILED DESCRIPTION

Figure 1A:
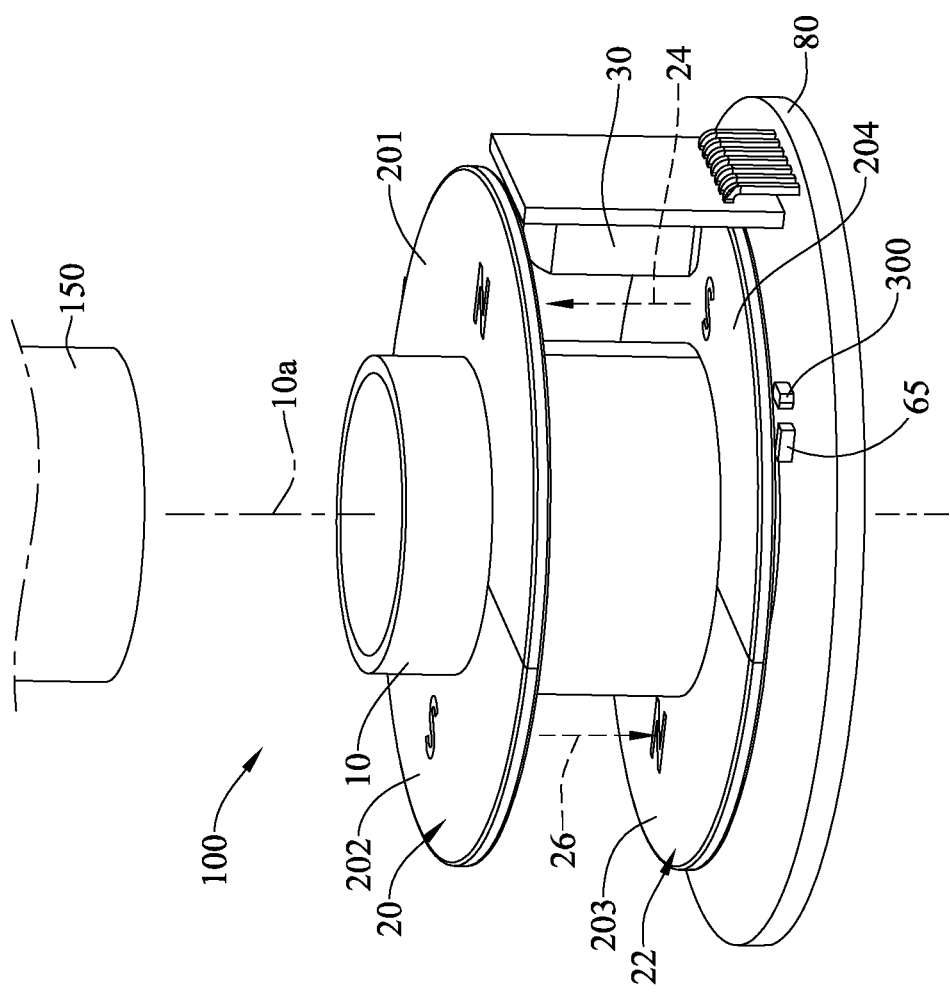
FIG. 1A is a schematic perspective view of an exemplary embodiment of the battery-free rotation detecting device in accordance with this disclosure.

In the following detailed description, for purposes of explanation, numerous specific details are set forth in order to provide a thorough understanding of the disclosed exemplary embodiments. It will be apparent, however, that one or more exemplary embodiments may be practiced without these specific details. In other instances, well-known structures and devices are schematically shown in order to simplify the drawing.

Firstly, referring to FIG. 1A, a schematic perspective view of an exemplary embodiment of the battery-free rotation detecting device in accordance with this disclosure is shown. The battery-free rotation detecting device 100, applied to engaged a rotating element 150, includes a rotating carrier 10, a first magnetic element 20, a second magnetic element 22 and a first detection coil set 30. The battery-free rotation detecting device 100 is mainly to detect and monitor whether or not the rotating element 150 is rotating.

The rotating carrier 10, engaged with or assembled to the rotating element 150, is driven to rotate by the rotating element 150 so as to further rotate the first magnetic element 20 and the second magnetic element 22 synchronously. The rotating carrier 10 can be a circular shell structure defined along an axis of rotation 10a. To rotate with the rotating element 150, the rotating carrier 10 can rotate clockwise or counter clockwise about the axis of rotation 10a. Practically, the rotating element 150 can be a motor, a servo motor, a brush-less motor, and any the like.

The first magnetic element 20 is disposed to the rotating carrier 10 by having an inner rim of the first magnetic element 20 to fit tightly around an end (the upper end shown in the figure) of the rotating carrier 10. The first magnetic element 20 is roughly shaped to be a disc in this exemplary embodiment, but not limited thereto according to this disclosure. The first magnetic element 20 is structured to have two opposite magnetic poles, an N-pole segment 201 and an S-pole segment 202.

The second magnetic element 22 is also disposed to the rotating carrier 10 by having an inner rim of the second magnetic element 22 to fit tightly around another end (the lower end shown in the figure) of the rotating carrier 10. The second magnetic element 22 is roughly shaped to be a disc in this exemplary embodiment, but not limited thereto according to this disclosure. The second magnetic element 22 is structured to have two opposite magnetic poles, an N-pole segment 203 and an S-pole segment 204.

The N-pole segment 201 and the S-pole segment 202 of the first magnetic element 20 are located above and spatially to match the S-pole segment 204 and the N-pole segment 203 of the second magnetic element 22, respectively. That is, respective to the axis of rotation 10a, the N-pole segment 201 of the first magnetic element 20 and the S-pole segment 204 of the second magnetic element 22 are disposed at the same angling. Also, respective to the axis of rotation 10a, the S-pole segment 202 of the first magnetic element 20 and the N-pole segment 203 of the second magnetic element 22 are disposed at the same angling. For example, respective to the axis of rotation 10a, the N-pole segment 201 and the S-pole segment 202 of the first magnetic element 20 are disposed at the angular positions of 0° and 180°, respectively, and the N-pole segment 203 and the S-pole segment 204 of the second magnetic element 22 are disposed at the angular positions of 180° and 0°, respectively. In other words, the N-pole segment 201 of the first magnetic element 20 is faced directly by the S-pole segment 204 of the second magnetic element 22, while the S-pole segment 202 of the first magnetic element 20 is faced directly by the N-pole segment 203 of the second magnetic element 22.

The first magnetic element 20 has an area substantially equal to that of the second magnetic element 22. The second magnetic element 22 is located within a straight-down projection of the first magnetic element 20 along the axis of rotation 10a. The N-pole segment 201 of the first magnetic element 20 is located right above the S-pole segment 204 of the second magnetic element 22, and thus an upward magnetic field direction 24 parallel to the axis of rotation 10a can be formed. Namely, the S-pole segment 204 of the second magnetic element 22 is located within a straight-down projection of the N-pole segment 201 of the first magnetic element 20 along the axis of rotation 10a. In addition, the S-pole segment 202 of the first magnetic element 20 is located right above the N-pole segment 203 of the second magnetic element 22, and thus a downward magnetic field direction 26 parallel to the axis of rotation 10a can be formed. Namely, the N-pole segment 203 of the second magnetic element 22 is located within a straight-down projection of the S-pole segment 202 of the first magnetic element 20 along the axis of rotation 10a.

The first detection coil set 30 is disposed between the first magnetic element 20 and the second magnetic element 22. In detail, the first detection coil set 30 is located within the vertical projection of the first magnetic element 20 along the axis of rotation 10a. The first detection coil set 30, made of a composite material that can induce great Barkhausen effect, includes a composite magnetic wire 32, such as a Wiegand wire, and a pick-up coil 34. Further, referring to FIG. 1C, an exemplary example of the first detection coil set according to this disclosure is schematically shown. This first detection coil set 30 is extended around and along a coil axis 32a, in which the coil axis 32a is parallel to the axis of rotation 10a. The composite magnetic wire 32 penetrates through the pick-up coil 34, but without any electrical contact in between. Preferably, the coil axis 32a is also a central axis of the composite magnetic wire 32.

When the first detection coil set 30 detects any magnetic change of the magnetic field between the first magnetic element 20 and the second magnetic element 22 (i.e., around the first detection coil set 30), the first detection coil set 30 would generate a corresponding electrical signal. Practically, when the first magnetic element 20 and the second magnetic element 22 are rotated by the rotating element 150, then the rotating first and second magnetic elements 20, 22 would also vary their position relationships with respect to the motionless first detection coil set 30. Namely, while the first magnetic element 20 and the second magnetic element 22 are rotated, the first detection coil set 30 would detect changes in the the magnetic field passing by. Thereupon, in this exemplary embodiment, for every 360° rotation of the rotating element 150, the first detection coil set 30 would sense a reversal change of the magnetic field, and thus generate a corresponding electrical signal.

It shall be explained that, in this exemplary embodiment of the battery-free rotation detecting device, the axis of rotation 10a, the magnetic field direction 24 of the magnetic field between the first magnetic element 20 and the second magnetic element 22, the magnetic field direction 26, and the coil axis 32a are all parallel to each other. Since the first detection coil set 30 is disposed between the first magnetic element 20 and the second magnetic element 22, no particular mounting difficulty would be met practically. With the empty space between the first magnetic element 20 and the second magnetic element 22, more than one detection coil can be implemented without raising a concern in increasing the entire dimensions of the device, such that the design requirement in miniaturization can be met. In addition, with the double magnetic plates in parallel (i.e., the first magnetic element 20 and the second magnetic element 22) in this disclosure, the magnetic flux density of the induced magnetic field would be much uniform.

Figure 1B:
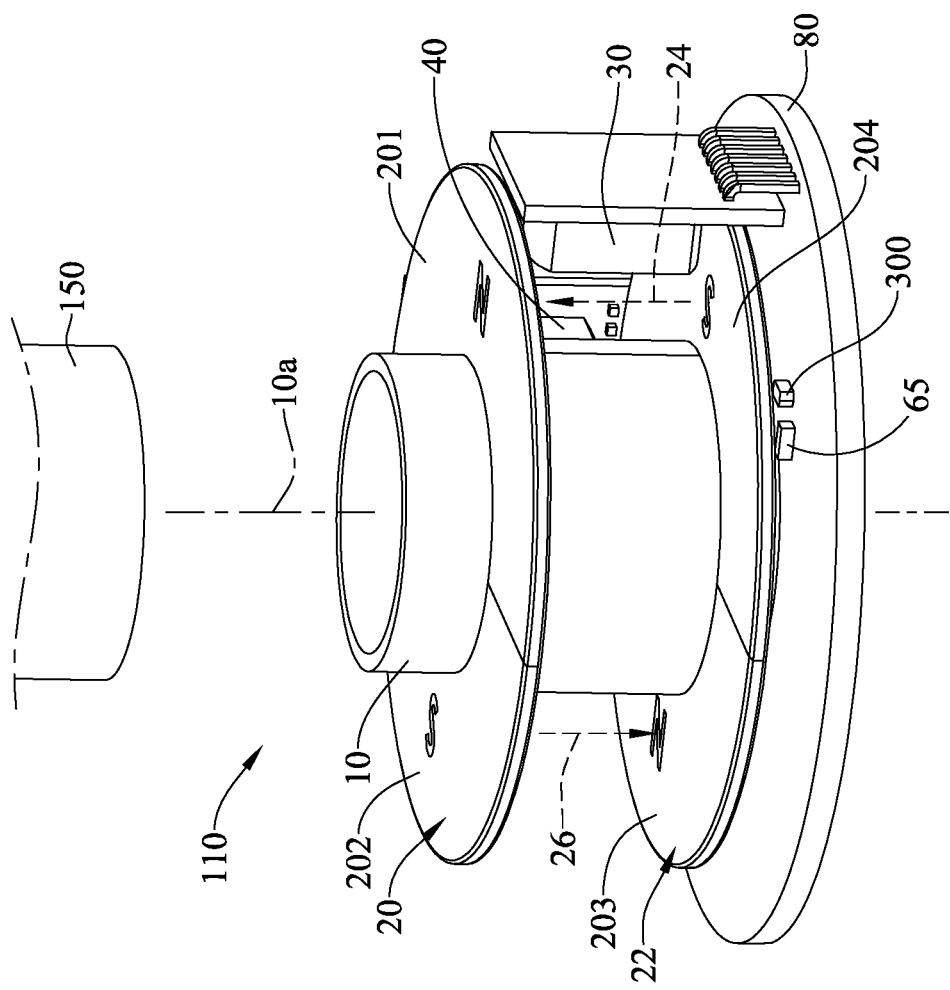
FIG. 1B is a schematic perspective view of an exemplary embodiment of the battery-free rotation detecting device in accordance with this disclosure.
Figure 1C:
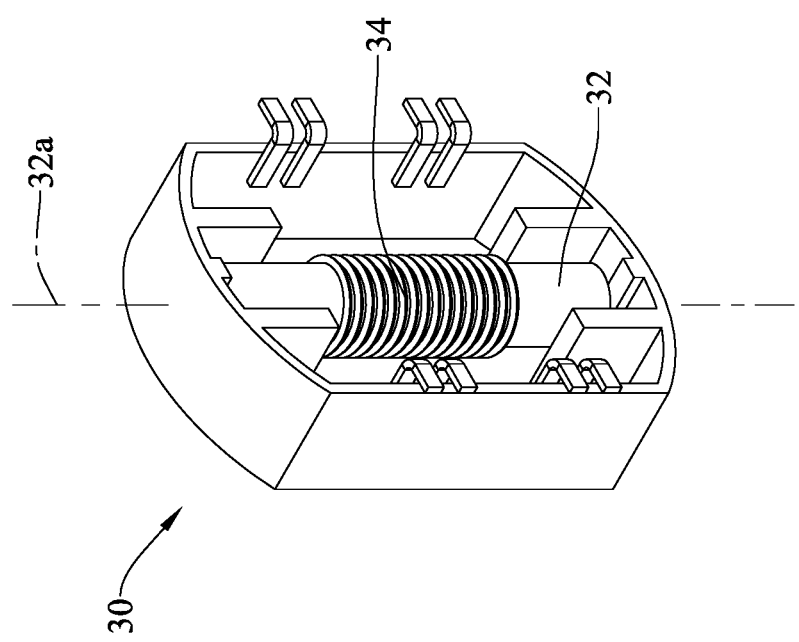
FIG. 1C is a schematic perspective view of an exemplary example of the first detection coil set in accordance with this disclosure.

Then, referring to FIG. 1B, an exemplary embodiment of the battery-free rotation detecting device in accordance with this disclosure is schematically shown. In this exemplary embodiment, the battery-free rotation detecting device 110, to be assembled with the rotating element 150, includes a rotating carrier 10, a first magnetic element 20, a second magnetic element 22, a first detection coil set 30 and a second detection coil set 40. The rotating carrier 10, the first magnetic element 20, the second magnetic element 22 and the first detection coil set 30 of this exemplary embodiment are resembled structurally to those of the exemplary embodiment of FIG. 1A, and thus details thereabout would be omitted herein. In this exemplary embodiment, the second detection coil set 40 is disposed between the first magnetic element 20 and the second magnetic element 22. Precisely, the second detection coil set 40 is located within the vertical projection of the first magnetic element 20 along the axis of rotation 10a, spaced to the first detection coil set 30 by a predetermined distance. In this exemplary embodiment, a 90° angle respective to the axis of rotation 10a is formed between the first detection coil set 30 and the second detection coil set 4. However, in some other embodiments, the radial angle between the first detection coil set 30 and the second detection coil set 40, respective to the axis of rotation 10a, may be any angle between 30° and 130°. Similarly, the second detection coil set 40, made of a composite material that can induce great Barkhausen effect, includes a composite magnetic wire, such as a Wiegand wire, and a pick-up coil, as shown in FIG. 1C. Again, details about the second detection coil set 40, which is structurally the same as the previous first detection coil set 30, would be omitted herein.

When any of the first detection coil set 30 and the second detection coil set 40 detects a magnetic change of the magnetic field between the first magnetic element 20 and the second magnetic element 22, the first detection coil set 30 or the second detection coil set 40 would generate a corresponding electrical signal. Practically, when the first magnetic element 20 and the second magnetic element 22 are rotated by the rotating element 150, then the rotating first and second magnetic elements 20, 22 would also vary their position relationships with respect to the motionless first and second detection coil sets 30, 40. Namely, while the first magnetic element 20 and the second magnetic element 22 are rotated, each of the first detection coil set 30 and the second detection coil set 40 would detect respective changes in the the magnetic field passing by. Thereupon, in this exemplary embodiment, for every 360° rotation of the rotating element 150, each of the first and second detection coil sets 30, 40 would sense a reversal change of the magnetic field, and thus generate a corresponding electrical signal.

Similarly, in this exemplary embodiment, the axis of rotation 10a, the magnetic field direction 24 of the magnetic field between the first and second magnetic elements 20, 22, the magnetic field direction 26, and the coil axis 32a are all parallel to each other. Since the first detection coil set 30 and the second detection coil set 40 are both disposed between the first magnetic element 20 and the second magnetic element 22, thus no particular mounting difficulty would be met practically. With the broad empty space between the first magnetic element 20 and the second magnetic element 22, more than two detection coil can be implemented without raising a concern in increasing the entire dimensions of the device, such that the design requirement in miniaturization can be met. In addition, with the double magnetic plates in parallel (i.e., the first magnetic element 20 and the second magnetic element 22) in this disclosure, the magnetic flux density of the induced magnetic field would be much uniform.

Figure 2A:
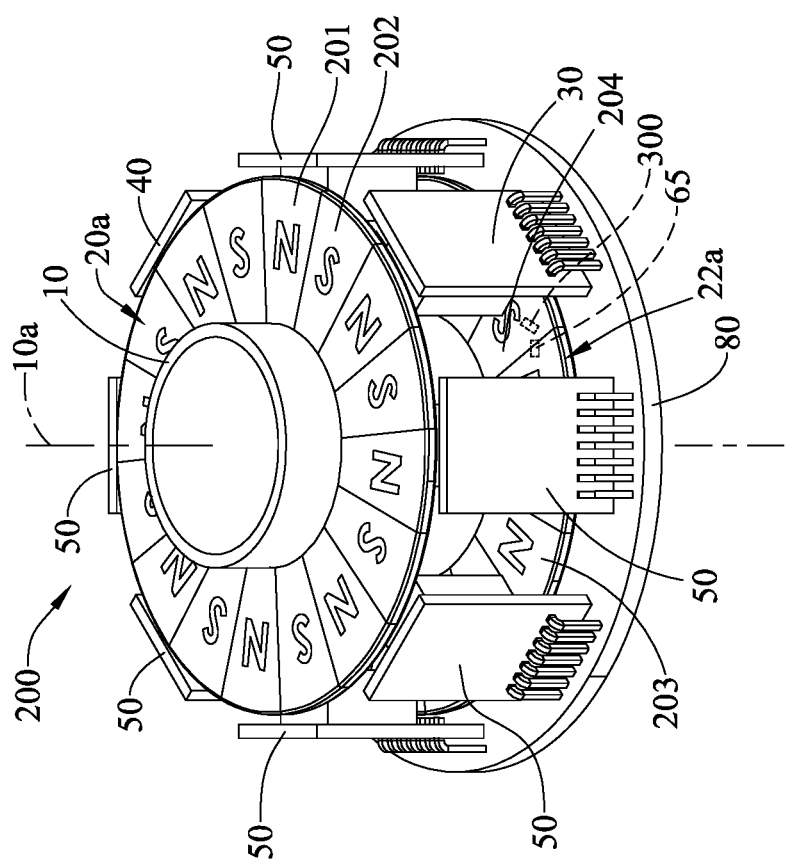
FIG. 2A is a schematic perspective view of an exemplary embodiment of the battery-free rotation detecting device in accordance with this disclosure.

Referring to FIG. 2A, a schematic perspective view of an exemplary embodiment of the battery-free rotation detecting device in accordance with this disclosure is shown. The different between the battery-free rotation detecting device 200 of this exemplary embodiment and that 110 of FIG. 1B is that, in this exemplary embodiment, each of the first magnetic element 20a and the second magnetic element 22a has more than two opposite magnetic poles (as shown, each of the magnetic elements has 8 N-pole segments and 8 S-pole segments preferably in an interlaced manner). The first magnetic element 20a includes a plurality of N-pole segments 201 and a plurality of S-pole segments 202, and the second magnetic element 22a includes a plurality of N-pole segments 203 and a plurality of S-pole segments 204. The N-pole segments 201 and the S-pole segments 202 of the first magnetic element 20a are arranged to surround the axis of rotation 10a in an interlaced manner at equal angular intervals, and the N-pole segments 203 and the S-pole segments 204 of the second magnetic element 22a are arranged to surround the axis of rotation 10a in an interlaced manner at equal angular intervals. Each of the N-pole segments 201 of the first magnetic element 20a is disposed in correspondence with one of the S-pole segments 204 of the second magnetic element 22a at the same angling respective to the axis of rotation 10a. Similarly, each of the S-pole segments 202 of the first magnetic element 20a is disposed in correspondence with one of the N-pole segments 203 of the second magnetic element 22a at the same angling respective to the axis of rotation 10a. As shown, the S-pole segments 202 of the first magnetic element 20a are located at 0°, 45°, 90°, 135°, 180°, 225°, 270° and 315° respective to the axis of rotation 10a, and the N-pole segments 203 of the second magnetic element 22a are individually located at the same-angling positions with respect to the corresponding S-pole segments 202 of the first magnetic element 20a. In addition, the N-pole segments 201 of the first magnetic element 20a are located at 22.5°, 67.5°, 112.5°, 157.5°, 202.5°, 247.5°, 292.5° and 337.5° respective to the axis of rotation 10a, and the S-pole segments 204 of the second magnetic element 22a are individually located at the same-angling positions with respect to the corresponding N-pole segments 201 of the first magnetic element 20a. Thereupon, the N-pole segments 201 of the first magnetic element 20a would be individually located to face the corresponding S-pole segments 204 of the second magnetic element 22a, and the S-pole segments 202 of the first magnetic element 20a would be also individually located to face the corresponding N-pole segments 203 of the second magnetic element 22a.

Figure 2B:
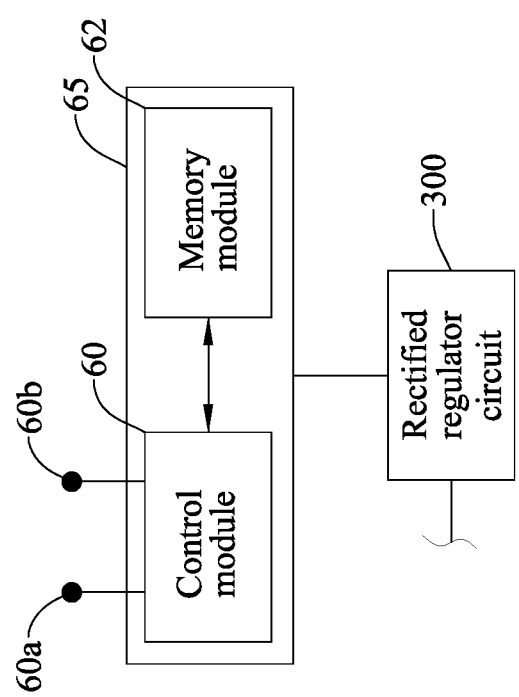
FIG. 2B is a schematic block view of an exemplary example of the processing circuit and the rectified regulator circuit in accordance with this disclosure.

In this exemplary embodiment, at least two coil sets 30, 40, 50 are disposed between the first magnetic element 20a and the second magnetic element 22a, and the coil sets 30, 40, 50 are arranged to surround the axis of rotation 10a by predetermined intervals. As shown in FIG. 2A, the plurality of coil sets 30, 40, 50 are separately disposed along outer rim of the second magnetic element 22a or the first magnetic element 20a by surrounding the axis of rotation 10a at predetermined intervals Further, referring to FIG. 2B, a processing circuit 65 of this exemplary embodiment is to electrically connect two of the coil set 30, 40, 50 and the rotation amount of the rotating element 150 is counted by evaluating the phase differences of the electrical signals transmitted from two of the coil sets. The processing circuit 65 includes a control module 60 and a memory module 62. In this exemplary embodiment, the first detection coil set 30 and the second detection coil set 40 are connected electrically with the first input port 60a and the second input port 60b of the control module 60, respectively. The control module 60, electrically connected with the memory module 62, is configured to receive the electrical signals transmitted from the first detection coil set 30 and the second detection coil set 40, and to derive rotation information including at least the rotation direction, the rotation count and the rotation angles according to the phase differences of the two electrical signals. The memory module 62 is configured to store the rotation information outputted from the control module 60.

Practically, the control module 60 can be consisted of ultra-low power field programmable gate arrays (FPGA), and the memory module 62 can be consisted of ferroelectric random access memories (FRAM).

In this exemplary embodiment, all eight power-supply coil sets 50 are parallel connected to each other, and then commonly and electrically connected with a rectified regulator circuit 300. The power-supply coil set 50 is configured to generate electrical signals, and these electrical signals are further processed by a rectified regulator circuit 300 before being provided to the processing circuit 65, for example, as the electrical power. In this exemplary embodiment, the power-supply coil set 50 is structurally resembled to the aforesaid first detection coil set 30 or the aforesaid second detection coil set 40, but not limited thereto. In other words, though the same structuring (as shown in FIG. 1C) may be applied to the detection coil set and the power-supply coil set in this disclosure, yet different names are assigned anyway to tell different use.

In this disclosure, the number of the magnetic poles at the first magnetic element 20a or the second magnetic element 22a is not limited to the aforesaid exemplary embodiments, but determined and adjusted per practical requirements. Similarly, the number of the power-supply coil sets is also not limited thereto, but determined per practical demands.

It shall be noted that, in this exemplary embodiment, a plurality of the detection coil sets 30, 40 and the power-supply coil sets 50 are separately provided to surround the axis of rotation roughly along the same rim of the device. Thus, with increasing number of the electrical signals, the entire thickness and volume of the battery-free rotation detecting device 200 can be still maintained to meet the requirement of miniaturization, and the battery-free rotation detecting device 200 can be provided simultaneously with rotational detection and power supply. Thereupon, when the electromechanical system meets a sudden power shutdown, the battery-free rotation detecting device 200 and the control module 60 can keep running for a while to track and record the rotation amount of the rotating element 150, due to the rotational inertia of the rotating element 150 and the device. In particular, the rotation information can be still recorded into the memory module 62 then. As the power to the rotating element 150 resumes, position correction or zeroing upon the rotating element 150 can be performed firstly through reading the recent rotation information stored in the memory module 62, such that no loss from missing information can occur.

In this exemplary embodiment, the rectified regulator circuit 300, electrically connected with the power-supply coil set 50, can include a rectifier module and a regulator module. The power-supply coil sets 50 are parallel connected to output the DC power transformed from the electrical signals, and then the rectified regulator circuit 300 stabilizes the DC power source before outputting the electrical energy. In this exemplary embodiment, the rectified regulator circuit 300 can output the electrical power to the processing circuit 65, but not limited thereto. In some other embodiments, the rectified regulator circuit can be used to energize other circuits.

Figure 3A:
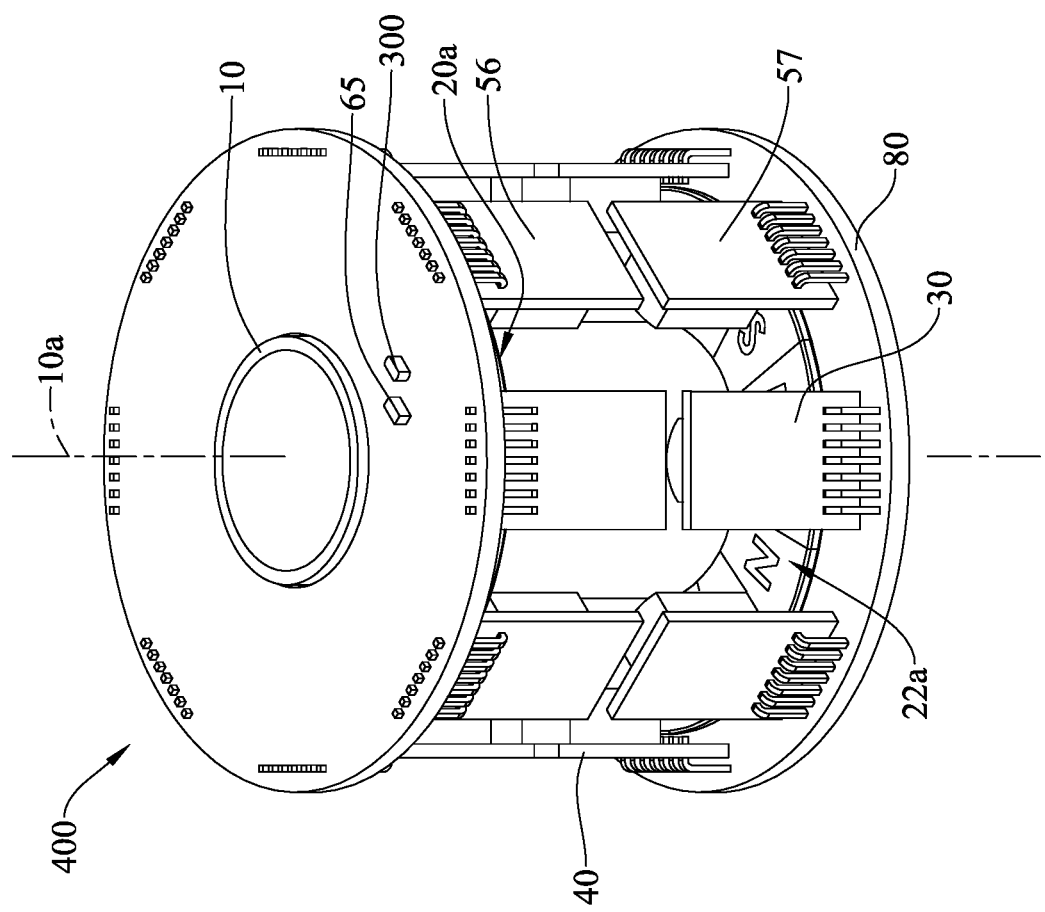
FIG. 3A is a schematic perspective view of an exemplary embodiment of the battery-free rotation detecting device in accordance with this disclosure.
Figure 3B:
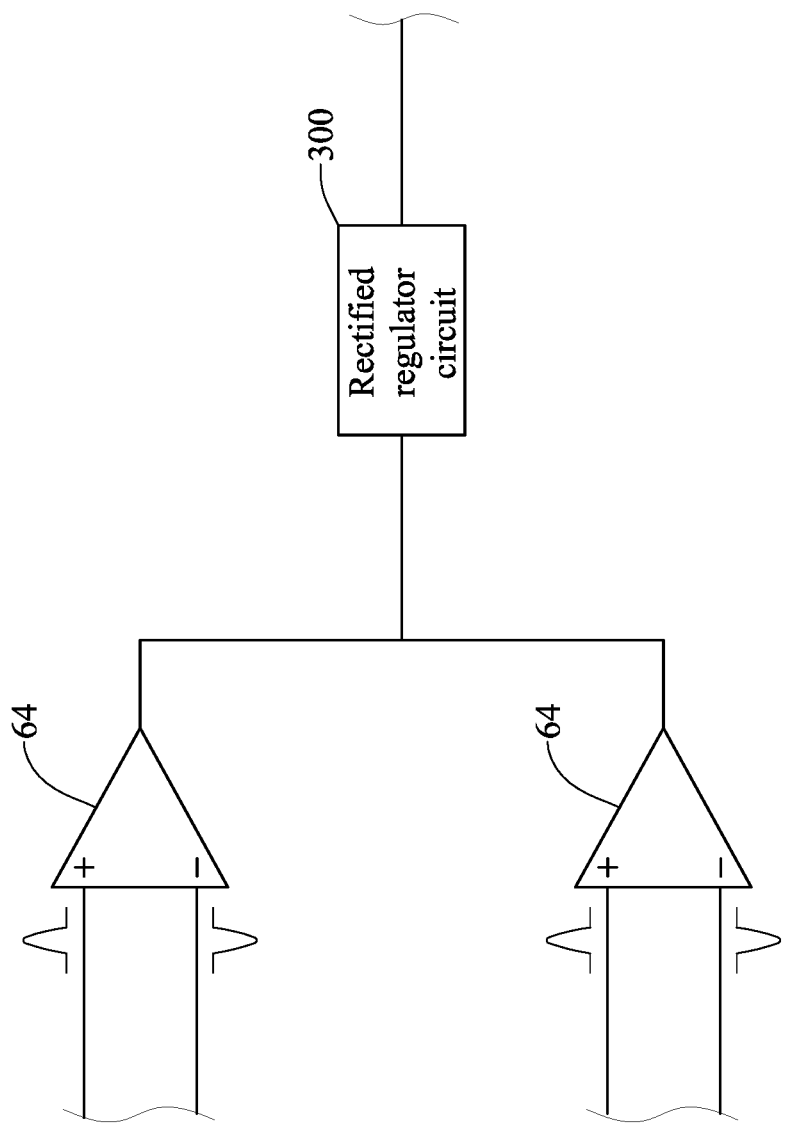
FIG. 3B is a schematic block view of an exemplary example of the differential amplifier and rectified regulator circuit in accordance with this disclosure.

Referring to FIG. 3A, a schematic perspective view of an exemplary embodiment of the battery-free rotation detecting device in accordance with this disclosure is shown. The difference between the battery-free rotation detecting device 400 of this exemplary embodiment and the battery-free rotation detecting device 200 of FIG. 2A is that, in this exemplary embodiment, the detection coil sets 30, 40 and the power-supply coil sets 50 of the battery-free rotation detecting device 400 are arranged into two circles, upper and lower, between the first magnetic element 20a and the second magnetic element 22a. In detail, some of the detection coil sets and the power-supply coil sets are arranged into an upper circular row adjacent to the first magnetic element 20a and extending substantially along the outer rim of the first magnetic element 20a or the second magnetic element 22a, while the rest thereof are arranged into a lower circular row adjacent to the second magnetic element 22a and extending substantially along the outer rim of the first magnetic element 20a or the second magnetic element 22a. In this exemplary embodiment, each of the detection coil sets and the power-supply coil sets close to the first magnetic element 20a is oriented oppositely to the corresponding one of the detection coil sets and the power-supply coil sets close to the second magnetic element 22a. Thereupon, with the same change of the magnetic field, the sensing signal outputted from the coil close to the first magnetic element 20a would be opposite to the sensing signal outputted from the coil close to the second magnetic element 22a.

Further, referring the exemplary embodiment shown in FIG. 3A, the battery-free rotation detecting device 400 further includes a plurality of differential amplifiers 64 electrically connected together. Each of the differential amplifiers 64 is to connect an upper coil and a corresponding lower coil at the same angling respective to the axis of rotation 10a. For example, when the power-supply coil set 56 and the power-supply coil set 57 of FIG. 3A are connected to the same differential amplifier 64, then, as the magnetic field passing through the power-supply coil set 56 and the power-supply coil set 57 changes the magnetic field direction (for example, the magnetic pole close to the power-supply coil set 56 is changed from the N pole to the S pole, and simultaneously the magnetic pole close to the power-supply coil set 57 is changed from the S pole to the N pole), the power-supply coil set 56 would issue a positive-voltage signal to the differential amplifier 64, but the opposite power-supply coil set 57 would issue a negative-voltage signal to the differential amplifier 64. As such, upon when the differential amplifier 64 receives these two electrical signals reverse to each other, strength of each of the electrical signals would be turned double for output (for example, +4 V or −4 V is turned into +8 V), so that the supplied power can be increased. It shall be explained that output ports of individual differential amplifiers 64 are connected in parallel to the rectified regulator circuit 300. In addition, the coil number of the detection coil set or the power-supply coil set is proportional to the issued number of the electrical signals.

Figure 4:
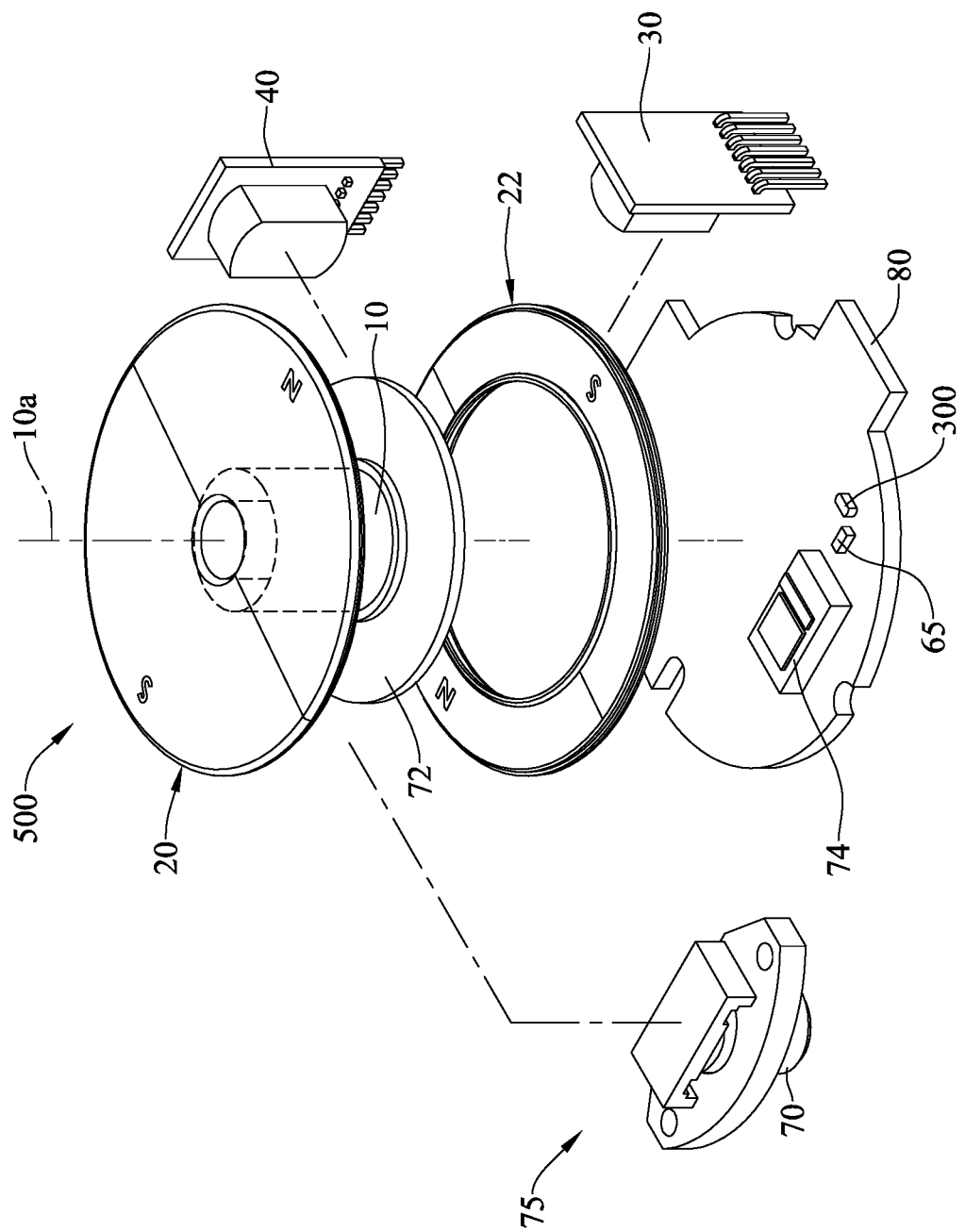
FIG. 4 is a schematic exploded view of an exemplary embodiment of the battery-free rotation detecting device in accordance with this disclosure.

Referring to FIG. 4, a schematic exploded view of an exemplary embodiment of the battery-free rotation detecting device in accordance with this disclosure is shown. The difference between the battery-free rotation detecting device 500 of this exemplary embodiment and the battery-free rotation detecting device 100 of FIG. 1A is that, in this exemplary embodiment, the battery-free rotation detecting device 500 further includes an optical encoder 75. The optical encoder 75 includes a light source module 70, a grating code disc 72 and an optical sensor 74.

The grating code disc 72 is disposed to rotating carrier 10. The light source module 70 is disposed between the first magnetic element 20 and the second magnetic element 22 to irradiate the grating code disc 72. Thus, as the optical encoder 75 is also constructed in the space between the first magnetic element 20 and the second magnetic element 22, no more increase in the entire dimensions of the device is required, and thus the design goal in miniaturization can be met. In this exemplary embodiment, the light source module 70 can be an infrared LED or a laser LED.

In this exemplary embodiment, the grating code disc 72 is consisted of a transparent portion and a non-transparent portion, in which the transparent portion allows the optical signal to pass through, and the non-transparent portion would block the optical signal.

The optical sensor 74, for receiving the light from the light source module 70, is disposed on the base circuit board 80 under the second magnetic element 22. The light from the light source module 70 would penetrate through the grating code disc 72, and then reach the optical sensor 74. As soon as the optical sensor 74 detects the light, then the rotation information would be formed at the optical sensor 74 and forwarded thereby. According to this disclosure, the rotation information can include an operation status, a rotational direction, a rotating angle or a rotation count.

It shall be explained that, in this exemplary embodiment, the battery-free rotation detecting device 500 can provide a first rotation information having a first resolution, and a second rotation information having a second resolution. The first rotation information is provided by the first detection coil set 30 and the second detection coil set 40, while the second rotation information is provided by the optical encoder 75. In addition, the optical encoder 75 of this exemplary embodiment can be applied to the aforesaid exemplary embodiment of FIG. 2A or FIG. 3A. For example, the light source module 70 can be installed to a position between the first magnetic element 20a and the second magnetic element 22a in the exemplary embodiment of FIG. 2A. In particular, the grating code disc 72 can be mounted at the rotating carrier 10, and the optical sensor 74 can be disposed on the base circuit board 80 under the second magnetic element 22a. Similarly, the light source module 70 can be installed to a position between the first magnetic element 20a and the second magnetic element 22a in the exemplary embodiment of FIG. 3A. In particular, the grating code disc 72 can be mounted at the rotating carrier 10, and the optical sensor 74 can be disposed on the base circuit board 80 under the second magnetic element 22a.

Figure 5A:
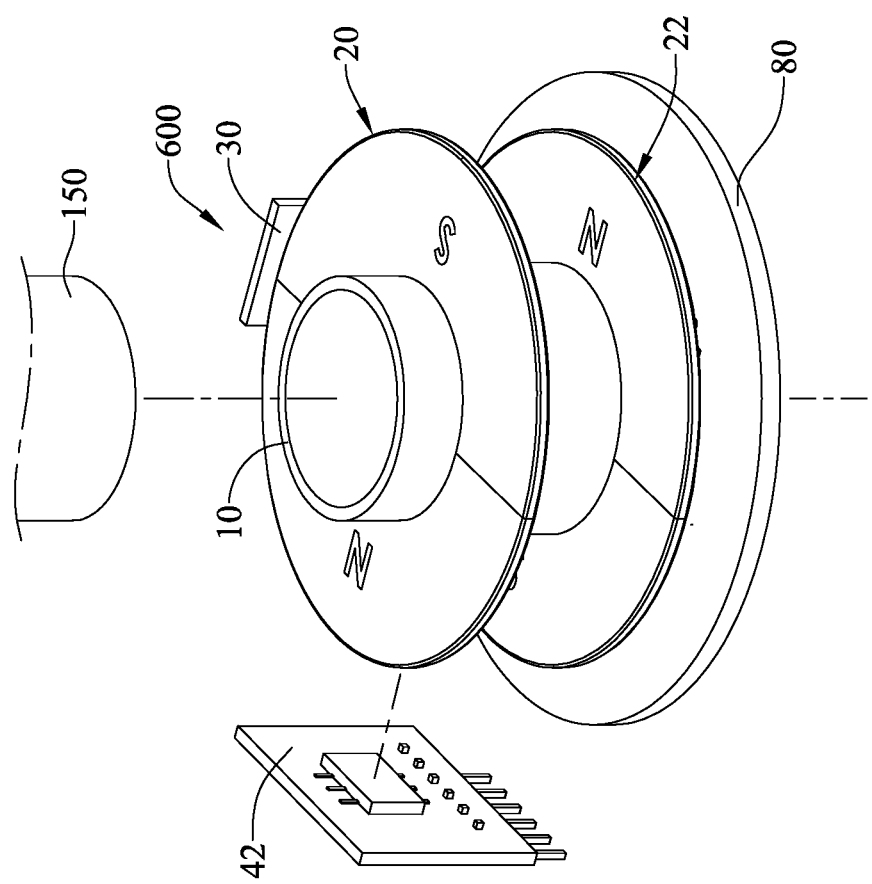
FIG. 5A is a schematic view of an exemplary embodiment of the battery-free rotation detecting device in accordance with this disclosure.

Referring to FIG. 5A, a schematic view of an exemplary embodiment of the battery-free rotation detecting device in accordance with this disclosure is shown. Similarly, both the battery-free rotation detecting device 600 of this exemplary embodiment and that 100 of FIG. 1A include the rotating carrier 10, the first magnetic element 20, the second magnetic element 22 and the first detection coil set 30. However, in this exemplary embodiment, the battery-free rotation detecting device 600 further includes a Hall sensor 42. The Hall sensor 42, functionally resembled to the first detection coil set 30, can detect the change of the magnetic field, and thereby issue a corresponding electrical signal.

Figure 5B:
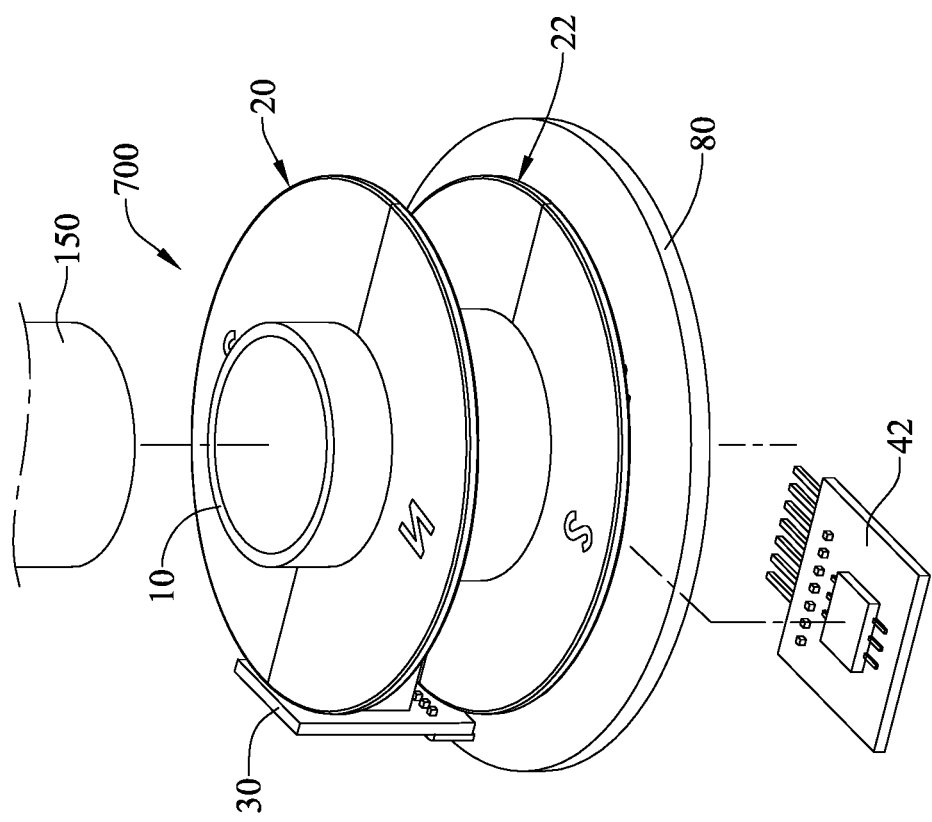
FIG. 5B is a schematic view of an exemplary embodiment of the battery-free rotation detecting device in accordance with this disclosure.

Referring to FIG. 5B, a schematic view of an exemplary embodiment of the battery-free rotation detecting device in accordance with this disclosure is shown. Similarly, both the battery-free rotation detecting device 700 of this exemplary embodiment and that 600 of FIG. 5A include the rotating carrier 10, the first magnetic element 20, the second magnetic element 22, the first detection coil set 30 and the Hall sensor 42. However, the difference in between is that, in this exemplary embodiment, the Hall sensor 42 is disposed at a bottom of the second magnetic element 22. In addition, the Hall sensor 42 of this exemplary embodiment can be moved to engage the exemplary embodiment of FIG. 4. For example, to the exemplary embodiment of FIG. 4, the Hall sensor 42 can be used to replace the second detection coil set 40, or the Hall sensor 42 can be disposed between the base circuit board 80 and the second magnetic element 22 by omitting the second detection coil set 40.

Figure 6A:
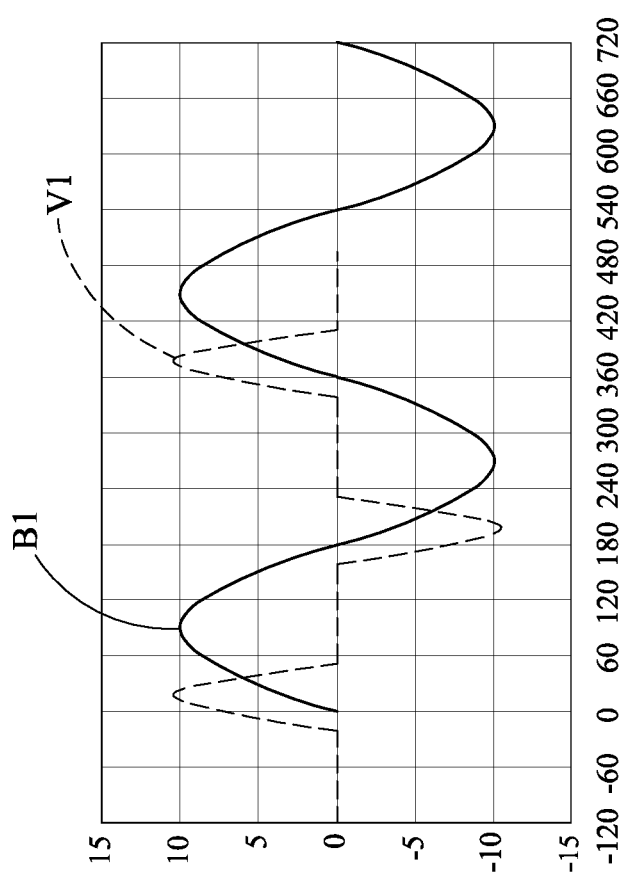
FIG. 6A demonstrates electric signals at the first detection coil while the battery-free rotation detecting device of FIG. 1B rotates clockwise.
Figure 6B:
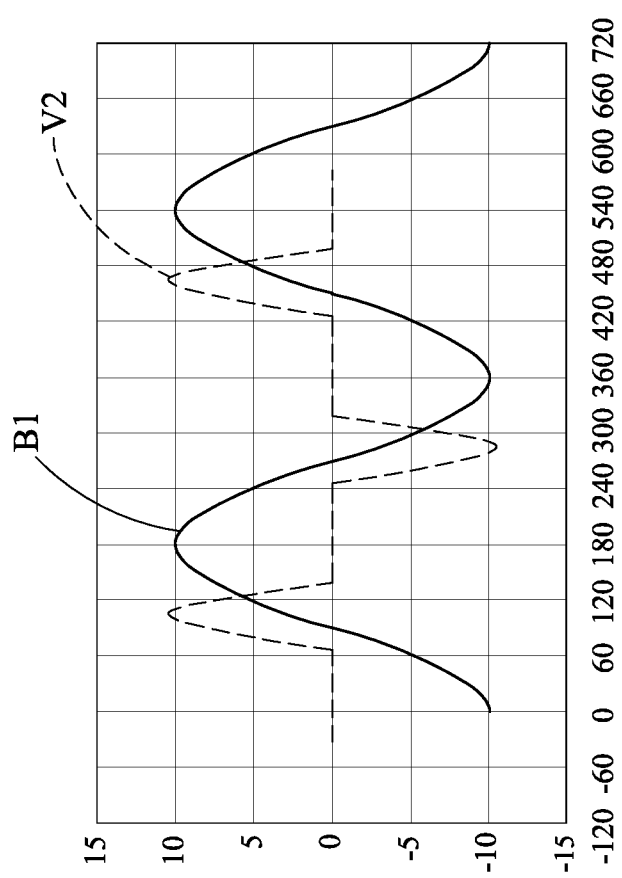
FIG. 6B demonstrates electric signals at the second detection coil while the battery-free rotation detecting device of FIG. 1B rotates clockwise.

Then, a method for judging the rotational direction of the exemplary embodiment of FIG. 1B is provided. Based on the electrical signals issued by the detection coil set, this method is performed mainly by the processing circuit 65. Refer now to FIG. 6A, FIG. 6B and Table 1, in which the horizontal axis of FIG. 6A or FIG. 6B is the rotating angle, and the vertical axis thereof is the magnetic flux density. When the rotating angle passes 360° in FIG. 6A, the first detection coil set 30 would generate a first electrical signal V1 in correspondence to a local change in the magnetic flux density B1 (told by the switch from an "L" (Low) to an "H" (High) in Table 1). Simultaneously, when the rotating angle passes 360° in FIG. 6B, the second detection coil set 40 would generate a second electrical signal V2 in correspondence to a local change in the magnetic flux density B1. However, the second electrical signal V2 is kept at a "Low" (in Table 1). Since no status is updated, thus the control module 60 would determine that the rotating element 150 is at a clockwise rotation, and the updated rotation count would be updated by "+1".

TABLE 1

| Status A | Status B | Updated status A | Updated status B | Updated rotation count |
|---|---|---|---|---|
| H | H | L | H | No change |
| L | H | L | H | No change |
| H | H | H | L | No change |
| H | L | L | L | −1 |
| L | H | L | L | No change |
| L | H | L | L | No change |

TABLE 1-continued

| Status A | Status B | Updated status A | Updated status B | Updated rotation count |
|---|---|---|---|---|
| L | L | H | L | +1 |
| L | L | L | H | No change |

Figure 6C:
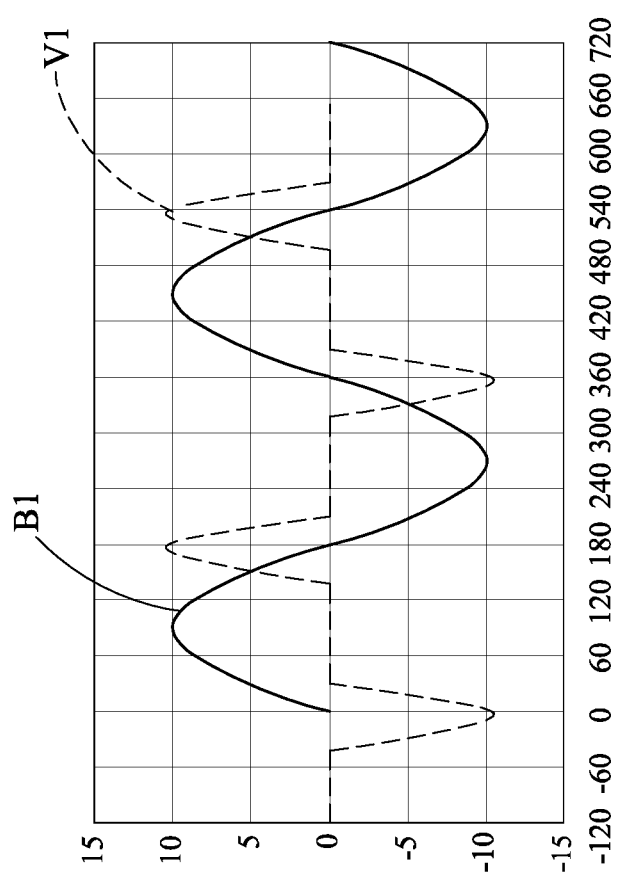
FIG. 6C demonstrates electric signals at the first detection coil while the battery-free rotation detecting device of FIG. 1B rotates counter clockwise.
Figure 6D:
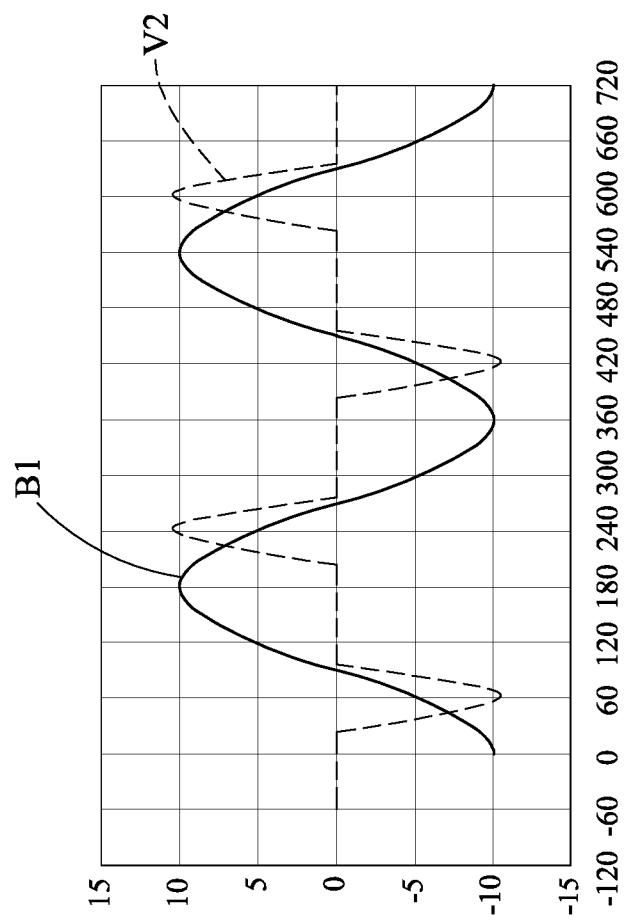
FIG. 6D demonstrates electric signals at the second detection coil while the battery-free rotation detecting device of FIG. 1B rotates clockwise.

Refer now to FIG. 6C, FIG. 6D and Table 1, in which the horizontal axis of FIG. 6C or FIG. 6D is the rotating angle, and the vertical axis thereof is the magnetic flux density. When the rotating angle passes 360° in FIG. 6C, the first detection coil set 30 would generate a first electrical signal V1 in correspondence to a local change in the magnetic flux density B1 (told by the switch from an "H" to an "L" in Table 1). Simultaneously, when the rotating angle passes 360° in FIG. 6D, the second detection coil set 40 would generate a second electrical signal V2 in correspondence to a local change in the magnetic flux density B1. However, the second electrical signal V2 is kept at a "Low" (in Table 1). Since no status is updated, thus the control module 60 would determine that the rotating element 150 is at a counter clockwise rotation, and the updated rotation count would be updated by "−1".

Then, the method for judging the rotational direction of the exemplary embodiment of FIG. 5A is explained. This method is also performed by the processing circuit 65 according to the electrical signals provided by the Hall sensor 42. As shown in Table, 2, when the rotating angle passes 360°, the first detection coil set 30 would generate an electrical signal turned from an "L" into an "H", but the electrical signal issued by the Hall sensor 42 is kept at an "L". Thus, the control module 60 would determine to update the rotation count by "+1". In addition, the exemplary embodiment of FIG. 5B would follow the method applied to that of FIG. 5A, and thus details thereabout would be omitted herein.

TABLE 2

| Status A | Status of Hall sensor | Updated status A | Updated status of Hall sensor | Updated rotation count |
|---|---|---|---|---|
| L | L | H | L | +1 |
| H | H | L | H | No change |
| H | L | L | L | −1 |
| L | H | H | H | No change |

In summary, the battery-free rotation detecting device provided by this disclosure can be directly integrated with the rotation device such as the encoder, the bicycle, the smart water meter and the wireless charging device. With the electricity induced by the magnetic elements and the detection coil sets and provided to the rectified regulator circuit, no more additional power supply or backup battery is required, and so the labor, the time and the cost for maintenance can be significantly reduced.

In addition, upon meeting a sudden electrical shutdown in the electromechanical system, the battery-free rotation detecting device of this disclosure can still provide functions in detecting the rotational speed, the rotation count and the rotational direction. Further, these foregoing rotation information can be recorded into a non-volatile memory. As the electromechanical system is resumed from the sudden shutdown, the rotation information stored in the non-volatile memory can be retrieved for position correction or zeroing at the rotating elements, so that unexpected damage to the electromechanical system can be avoided, and the safety as well as the reliability can be substantially enhanced.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A battery-free rotation detecting device, applied to engage a rotating element, comprising:
a rotating carrier, configured to engage the rotating element having an axis of rotation;
a first magnetic element, disposed to the rotating carrier and comprising a plurality of N-pole segments and a plurality of S-pole segments arranged in an interlaced manner at equal angular intervals to surround the axis of rotation;
a second magnetic element, disposed to the rotating carrier by being spaced from the first magnetic element and comprising a plurality of N-pole segments and a plurality of S-pole segments arranged in an interlaced manner at equal angular intervals to surround the axis of rotation, wherein the axis of rotation is parallel to a magnetic field direction between the first magnetic element and the second magnetic element; and
a plurality of detection coil sets, disposed between the first magnetic element and the second magnetic element, wherein some of the detection coil sets are arranged into an upper circular row adjacent to the first magnetic element and extend substantially along an outer rim of the first magnetic element, and a rest of the detection coil sets are arranged into a lower circular row adjacent to the second magnetic element and extending substantially along an outer rim of the second magnetic element;
wherein, as the rotating carrier is driven to rotate by the rotating element, the rotating carrier, the first magnetic element and the second magnetic element rotate with respect to the detection coil sets synchronously, and an electrical signal is induced in the detection coil sets by a change of a magnetic field around the detection coil sets, wherein an angular position of each of the N-pole segments of the first magnetic element is equal to an angular position of corresponding one of the S-pole segments of the second magnetic element, and an angular position of each of the S-pole segments of the first magnetic element is equal to an angular position of corresponding one of the N-pole segments of the second magnetic element, wherein the angular position is an angle surrounding the axis of rotation.

2. The battery-free rotation detecting device of claim 1, wherein each of the detection coil sets is extended along a coil axis parallel to the axis of rotation.

3. The battery-free rotation detecting device of claim 2, wherein each of the detection coil sets is made of a composite material with Barkhausen effect, and includes a composite magnetic wire and a pick-up coil.

4. The battery-free rotation detecting device of claim 3, wherein the coil axis is a central axis of the composite magnetic wire.

5. The battery-free rotation detecting device of claim 1, wherein adjacent two of the detection coil sets form a 90° angle respective to the axis of rotation.

6. The battery-free rotation detecting device of claim 1, further including a processing circuit electrically connected with two of the detection coil sets, wherein the processing circuit calculates a rotation amount of the rotating element according to phase differences of electrical signals outputted from the detection coil sets.

7. The battery-free rotation detecting device of claim 1, wherein the first magnetic element includes an N-pole segment and an S-pole segment, the second magnetic element includes an N-pole segment and an S-pole segment, the N-pole segment of the first magnetic element and the an S-pole segment of the second magnetic element are disposed at the same angle respective to the axis of rotation, and the S-pole segment of the first magnetic element and the an N-pole segment of the second magnetic element are disposed at the same angle respective to the axis of rotation.

8. The battery-free rotation detecting device of claim 1, wherein each of the N-pole segments of the first magnetic element is disposed at the same angle respective to the axis of rotation with corresponding one of the S-pole segments of the second magnetic element, and each of the S-pole segments of the first magnetic element is disposed at the same angle respective to the axis of rotation with corresponding one of the N-pole segments of the second magnetic element.

9. The battery-free rotation detecting device of claim 1, further including a Hall sensor disposed between the first magnetic element and the second magnetic element and configured to generate another electrical signal induced by a change of the magnetic field around the Hall sensor.

10. The battery-free rotation detecting device of claim 1, further including a Hall sensor disposed at a bottom of the second magnetic element and configured to generate another electrical signal induced by a change of the magnetic field around the Hall sensor.

11. A battery-free rotation detecting device, applied to engage a rotating element, comprising:
- a rotating carrier, configured to engage the rotating element having an axis of rotation;
- a first magnetic element, disposed to the rotating carrier and comprising a plurality of N-pole segments and a plurality of S-pole segments arranged in an interlaced manner at equal angular intervals to surround the axis of rotation;
- a second magnetic element, disposed to the rotating carrier by being spaced from the first magnetic element and comprising a plurality of N-pole segments and a plurality of S-pole segments arranged in an interlaced manner at equal angular intervals to surround the axis of rotation, wherein the axis of rotation is parallel to a magnetic field direction between the first magnetic element and the second magnetic element; and
- a plurality of detection coil sets, disposed between the first magnetic element and the second magnetic element, wherein some of the detection coil sets are arranged into an upper circular row adjacent to the first magnetic element and extend substantially along an outer rim of the first magnetic element, and a rest of the detection coil sets are arranged into a lower circular row adjacent to the second magnetic element and extending substantially along an outer rim of the second magnetic element;
- wherein, as the rotating carrier is driven to rotate by the rotating element, the rotating carrier, the first magnetic element and the second magnetic element rotate with respect to the detection coil sets synchronously, and an electrical signal is induced in the detection coil sets by a change of a magnetic field around the detection coil sets, wherein an angular position of each of the N-pole segments of the first magnetic element is equal to an angular position of corresponding one of the S-pole segments of the second magnetic element, and an angular position of each of the S-pole segments of the first magnetic element is equal to an angular position of corresponding one of the N-pole segments of the second magnetic element, wherein the angular position is an angle surrounding the axis of rotation;
- a light source module, disposed between the first magnetic element and the second magnetic element, configured to provide a light;
- a grating code disc, disposed to the rotating carrier; and
- an optical sensor, configured to receive the light penetrating through the grating code disc and further output a rotation information.

12. The battery-free rotation detecting device of claim 11, wherein each of the detection coil sets is extended along a coil axis parallel to the axis of rotation.

13. The battery-free rotation detecting device of claim 12, wherein each of the detection coil sets is made of a composite material with Barkhausen effect, and includes a composite magnetic wire and a pick-up coil.

14. The battery-free rotation detecting device of claim 13, wherein the coil axis is a central axis of the composite magnetic wire.

15. The battery-free rotation detecting device of claim 11, wherein adjacent two of the detection coil sets form a 90° angle respective to the axis of rotation.

16. The battery-free rotation detecting device of claim 11, further including a processing circuit electrically connected with two of the detection coil sets, wherein the processing circuit calculates a rotation amount of the rotating element according to phase differences of electrical signals outputted from the detection coil sets.

17. The battery-free rotation detecting device of claim 11, wherein the first magnetic element includes an N-pole segment and an S-pole segment, the second magnetic element includes an N-pole segment and an S-pole segment, the N-pole segment of the first magnetic element and the S-pole segment of the second magnetic element are disposed at the same angle respective to the axis of rotation, and the S-pole segment of the first magnetic element and the N-pole segment of the second magnetic element are disposed at the same angle respective to the axis of rotation.

18. The battery-free rotation detecting device of claim 11, wherein each of the N-pole segments of the first magnetic element is disposed at the same angle with corresponding one of the S-pole segments of the second magnetic element respective to the axis of rotation, and each of the S-pole segments of the first magnetic element is disposed at the same angle with corresponding one of the N-pole segments of the second magnetic element respective to the axis of rotation.

19. The battery-free rotation detecting device of claim 11, further including a Hall sensor disposed between the first magnetic element and the second magnetic element and configured to generate another corresponding electrical signal induced by a change of the magnetic field around the Hall sensor.

20. The battery-free rotation detecting device of claim 11, further including a Hall sensor disposed at a bottom of the second magnetic element and configured to generate another corresponding electrical signal induced by a change of the magnetic field around the Hall sensor.

* * * * *